Sept. 19, 1939.   P. KRONENBERG   2,173,756
PROCESS OF PRODUCING FOG OR MIST BY PARTIAL AND FLAMELESS COMBUSTION
Filed Oct. 22, 1935
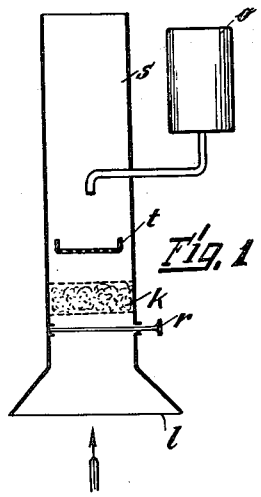
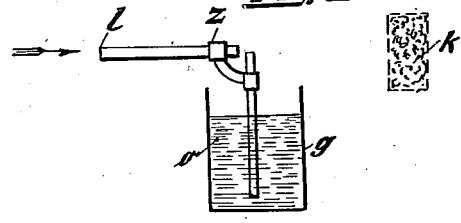
Inventor
Paul Kronenberg.

Patented Sept. 19, 1939

2,173,756

UNITED STATES PATENT OFFICE 2,173,756

PROCESS OF PRODUCING FOG OR MIST BY PARTIAL AND FLAMELESS COMBUSTION

Paul Kronenberg, Berlin, Germany

Application October 22, 1935, Serial No. 46,230
In Germany March 13, 1933

1 Claim. (Cl. 252—1)

This invention relates to a process of and apparatus for producing fog or mist by partial and flameless combustion.

The production of non-poisonous fogs on the large scale by simple means is of particular importance for the protection of inhabited districts and also for military camouflage. A neutral fog for plant protection is also greatly desired.

The production of oil fogs or more correctly, oil smoke, is already known and tried. In the known processes, oils, fats or other organic substances are allowed to burn in association with saltpetre or chlorates. Mainly, in so doing, a more or less black to brown smoke is produced. The drawbacks of these smoke fumes are known. It is also known to vaporise oil, but the resulting mist is unstable. It is also known to produce fogs by the partial combustion of oil but all these fogs also are coloured. In the majority of processes, a large part of the substance to be transformed into mist is simply burned away without taking any part in the formation of the fog.

The process of the present invention prevents any noticeable combustion—that is to say, combustion accompanied by the occurrence of flames and loss of originating material—and furnishes white fog or mist, but no smoke. Moreover, in addition to the advantage of cheapness, the hereindescribed process offers that of extremely simple manipulation and, if desired, without any special apparatus. This advantage is specially important in connection with the destruction of pests.

According to the invention, an organic compound (oil or the like) is transformed into fog or mist by partial and flameless combustion with free access of air on oxidising catalysts. After being warmed for a short time, the catalyst oxidises only 15–25% of the oil or other organic compound employed by incandescence without any flame phenomena, the resulting substances being allowed to escape as mist, in conjunction with the unoxidised portions.

Originating materials suitable for the production of fogs or mists are crude paraffin oil, solid paraffin, lignite oils, crude vaseline, naphthalene, anthracene, mineral oils of all kinds, nitrobenzene, aniline, turpentine, tallow, tar, pitch or other heavy hydrocarbons and organic compounds which do not leave any solid residues when burned.

Oxidising catalysts that come under consideration are the oxides of cadmium, cerium, vanadium, uranium, cobalt, nickel, manganese, chromium, copper, iron, gas-purifying compositions, or oxides of elements (or mixtures of same) producing a similar effect. The catalysts may be employed in the form of wire or granules, or be deposited on a special carrier. All that is needed for their preparation is for example, to calcine salts formed by the combination of volatile acids with the said elements. If the catalyst be absolutely dry and extremely fine, it will be capable of directly transforming the organic substance on exposure to air, automatically and without more ado. In practice, it is troublesome in the first place to prepare the catalyst in such a finely divided condition, and secondly, to keep it absolutely dry. Catalysts prepared in a not specially fine state of division are warmed before use, for example, electrically, or by means of a flame or by suffusing them with benzine, alcohol, or the like, and igniting the latter. The catalyst will then be ready for the production of mist and can be used over and over again.

The heat generated in the catalyst during the production of mist varies between 400 and 600° C. according to the organic substance employed. When definitely specified conditions are observed, the temperature remains constant. The action of the catalyst extends to partially oxidising the organic substance used and vaporising it at the same time.

The operation is performed by bringing oil or the like into contact with the catalyst (which has been warmed just previously) air being admitted at the same time. On contact with the catalyst, the oil is immediately converted into mist and finally heats the catalyst up to about 500° C.

The following example typifies the chemical reaction: 100 grms. of oleic acid (chosen because it has the definite formula $C_{18}H_{34}O_2$) are transformed into mist on the catalyst with 725 litres of air, 34.8% of the atmospheric oxygen being thereby consumed. The liberated misty air contains 3% of carbon dioxide, the formation of which has necessitated the consumption of 49% of the oxygen actually consumed. Calculating from this experimentally determined amount of carbon dioxide, the amount of oxygen consumed in the formation of water amounts to 18.6% leaving a further 32.4% of oxygen serving only for the partial oxidation of the oleic acid. Only 18% of the oleic acid is completely burned. The operation produces:

(1) Carbon dioxide and water;
(2) Oxidised compounds; and
(3) Oleic acid that has merely been vaporised.

The water, oxidised compounds and oil vapour form the mist which is of the same density as phosphorus mist. Weight for weight, phosphorus and oleic acid, converted into mist in a given space, will dim light to an approximately equal extent, the effect of oleic acid being even slightly more powerful. The resulting mist might be compared with a London fog.

The invention will hereinafter be more fully described with reference to the following examples and to the accompanying drawing, which illustrate diagrammatically and by way of example, various embodiments of apparatus suitable for carrying the same into effect, and in which:

Fig. 1 is a diagrammatic representation of one embodiment;

Fig. 2 is a similar representation of a second embodiment.

Example I

A typical apparatus is formed by placing a catalyst K on a wire gauze in the lower part of a shaft S, Fig. 1, provided in its lower portion with an air damper R, the oil O being admitted in drops through a lateral opening in the shaft. Alternatively, a tin T, with fine perforations is disposed above the catalyst, said tin containing the solid organic substance which liquefies on warming. After the catalyst has been warmed, the organic substance is allowed to drop onto it and the air supply R is adjusted.

Example II

Nickel wire gauze is stretched above and below over a ring 1–2 cm. thick and 20–30 cm. in diameter. Pieces of manganese dioxide of the size of linseed are laid between the wire gauze and the disc K filled in this manner, Fig. 2, is mounted on a stand and suffused with alcohol or benzine. The benzine is ignited and must be allowed to burn itself out. The jet from an oil atomiser Z, of known type is now directed on to the catalyst and the mist appears at once, either behind or above the catalyst, according to the position chosen.

I claim:

A process of producing fog or mist which comprises the steps of, applying in divided liquid form an organic substance which leaves no solid residue when burned and selected from the group consisting of crude paraffin oil, solid paraffin, lignite oil, crude vaseline, naphthalene, anthracene, oleic acid, mineral oils, tallow, tar and pitch, to an oxidizing catalyst consisting of a metallic oxide on a porous carrier in the presence of air, such substance being applied in such quantities as will produce a partial and flameless combustion.

PAUL KRONENBERG.